(12) United States Patent
Yonushonis et al.

(10) Patent No.: US 11,113,774 B2
(45) Date of Patent: Sep. 7, 2021

(54) SYSTEM, METHOD, AND APPARATUS FOR INDIVIDUAL INNOVATOR MARKETING AND RECOGNITION

(71) Applicant: Cummins, Inc., Columbus, IN (US)

(72) Inventors: Thomas M. Yonushonis, Columbus, IN (US); Thanigasalam Chettiyar, Columbus, IN (US); Joan M. Wills, Nashville, IN (US); J. Stephen Wills, Columbus, IN (US)

(73) Assignee: Cummins, Inc., Columbus, IN (US)

(*) Notice: Subject to any disclaimer, the term of this patent is extended or adjusted under 35 U.S.C. 154(b) by 605 days.

(21) Appl. No.: 15/150,967

(22) Filed: May 10, 2016

(65) Prior Publication Data
US 2016/0335732 A1 Nov. 17, 2016

Related U.S. Application Data

(60) Provisional application No. 62/161,734, filed on May 14, 2015.

(51) Int. Cl.
*G06Q 50/18* (2012.01)
*G06Q 40/06* (2012.01)

(52) U.S. Cl.
CPC .......... *G06Q 50/184* (2013.01); *G06Q 40/06* (2013.01)

(58) Field of Classification Search
CPC ... G06Q 50/184; G06Q 40/06; G06Q 30/0261
USPC ....................................... 705/14.49
See application file for complete search history.

(56) References Cited

U.S. PATENT DOCUMENTS

| | | | |
|---|---|---|---|
| 6,990,480 B1* | 1/2006 | Burt | G06F 40/18 |
| 7,949,728 B2* | 5/2011 | Rivette | G06F 17/30011 |
| | | | 709/203 |
| 8,290,807 B2 | 10/2012 | Al-Otaibi et al. | |
| 9,043,414 B1* | 5/2015 | Rachabathuni | H04L 29/06 |
| | | | 709/206 |
| 9,886,814 B2* | 2/2018 | Steelberg | G06Q 20/12 |
| 2008/0281616 A1 | 11/2008 | Johnson | |
| 2012/0054002 A1 | 3/2012 | Rotbard et al. | |
| 2012/0183938 A1 | 7/2012 | Hilton et al. | |
| 2014/0236723 A1* | 8/2014 | Abhyanker | G06Q 10/087 |
| | | | 705/14.57 |

* cited by examiner

*Primary Examiner* — Azam A Ansari
(74) *Attorney, Agent, or Firm* — Foley & Lardner LLP

(57) ABSTRACT

Various embodiments disclosed herein relate to the access, management, and targeted display of one or more asset display profiles to a person of interest (e.g., an associated asset creator, a customer, etc.). A method includes interpreting an asset display profile corresponding to a creative asset description and an associated asset creator; determining an asset display context; and in response to the asset display profile and the asset display context, providing an asset display description to an output device.

14 Claims, 9 Drawing Sheets

FIG. 4

SYSTEM, METHOD, AND APPARATUS FOR INDIVIDUAL INNOVATOR MARKETING AND RECOGNITION

CROSS-REFERENCE TO RELATED APPLICATION

This application claims the benefit of U.S. Provisional Patent Application No. 62/161,734, filed May 14, 2015, entitled "SYSTEM, METHOD, AND APPARATUS FOR INDIVIDUAL INNOVATOR MARKETING AND RECOGNITION," which is incorporated herein by reference in its entirety.

BACKGROUND

Intellectual property assets in various forms are a major part of most business asset portfolios. Businesses have various incentives to provide recognition and visibility to the creators of those intellectual property assets. A business traditionally might have a central location with a physical display recognizing the assets that have been developed and the creators of those assets. Another recognition format might include the distribution of plaques for display in the individual workspace of the individual. Traditional methods of recognition have various drawbacks in the workplace of the information age. Among the drawbacks include: information security limiting the display of certain types of assets to avoid visitors or even internal parties without a need-to-know seeing those assets; a static display unable to update assets as they change over time; a limited display format amenable only to certain asset types (e.g., patents); a lack of physical space to display a growing asset portfolio; a lack of a central physical location where employees are likely to see a display due to the global nature of a business and/or a changing workplace (e.g. working at home, etc.); and/or a changing work environment leaving no individual workspace to display asset recognition, such as individuals working at home or in unassigned workspace environments. While these drawbacks exist in traditional recognition formats, some or all of these drawbacks may not have yet been recognized in the art yet.

SUMMARY

Various embodiments disclosed herein relate to the access, management, and targeted display of one or more asset display profiles to a person of interest (e.g., an associated asset creator, a customer, etc.).

One embodiment relates to method including interpreting an asset display profile corresponding to a creative asset description and an associated asset creator; determining an asset display context; and in response to the asset display profile and the asset display context, providing an asset display description to an output device.

Another embodiment relates to a workplace environment. The workplace environment includes a plurality of workspace locations, a visual output device, and a controller. The controller includes an asset information module structured to access an asset display profile information set comprising a plurality of asset display profiles, each asset display profile comprising a creative asset description corresponding to an associated asset creator; an asset reward module structured to determine an asset display context; and an asset display module structured to provide an asset display description to the visual output device in response to the asset display profile and the asset display context.

Still another embodiment relates to an apparatus. The apparatus includes an asset information module structured to access an asset display profile information set comprising a plurality of asset display profiles, each asset display profile comprising a creative asset description corresponding to an associated asset creator; an asset reward module structured to determine an asset display context responsive to a selected asset display profile; and an asset display module structured to provide an asset display description to a visual output device in response to the asset display profile and the asset display context.

These and other features, together with the organization and manner of operation thereof, will become apparent from the following detailed description when taken in conjunction with the accompanying drawings.

BRIEF DESCRIPTION OF THE DRAWINGS

FIG. 4 illustrates a table relating to a selected or chosen asset, according to an example embodiment.

DESCRIPTION OF ILLUSTRATIVE EMBODIMENTS

Figure 1:
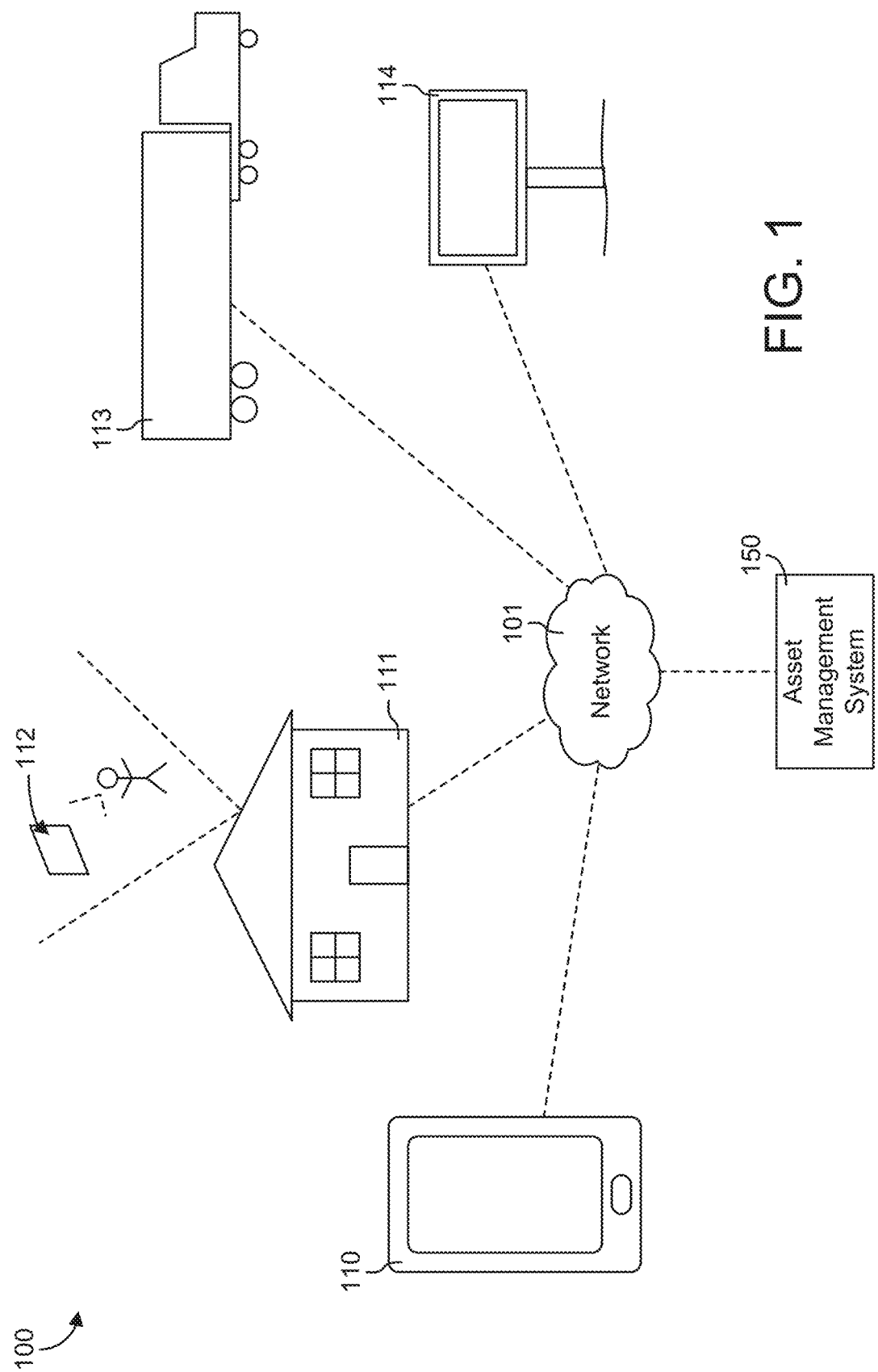
FIG. 1 is a schematic diagram of a workspace environment with a plurality of workplace locations communicably coupled to an asset management system, according to an example embodiment.

For the purposes of promoting an understanding of the principles of the disclosure, reference will now be made to the embodiments illustrated in the drawings and specific language will be used to describe the same. It will nevertheless be understood that no limitation of the scope of the disclosure is thereby intended, any alterations and further modifications in the illustrated embodiments, and any further applications of the principles of the disclosure as illustrated therein as would normally occur to one skilled in the art to which the disclosure relates are contemplated herein.

Referring to the Figures generally, the various systems, methods, and apparatuses provided herein relate to the organization, formatting, and providing of an asset display description to one or more output devices. Many companies have award programs setup for their employees (e.g., employee-of-the-month, recognition for inventors, etc.). In fact, many employees receive both company-internal award and external awards (e.g., a community organization environmental award, etc.) for their efforts in developing products, services, and the like. These awards may translate to "assets" for the company and the corresponding person(s). The systems and methods described herein relate to the tracking, management, and providing of tailored asset display description(s) to a target output device for a target audience (e.g., the associated asset creator, a customer, etc.). Consequently, the systems and methods provided herein may form a marketing tool for a company to promote the efforts of their employees, provide a unique recognition tool for those persons or groups, and facilitate an uplifting morale in the work environment among other benefits described herein.

Referring now to FIG. 1, a schematic diagram of a workspace environment with a plurality of workplace locations communicably coupled to an asset management system is shown according to one embodiment. The workspace environment 100 generally includes a plurality of output devices, shown as an input/output device 110, a workplace location 111 having one or more output devices 112, a vehicle 113, and an advertising display board 114. The plurality of output devices are communicably coupled over the network 101 to an asset management system 150 structured to access one or more asset display profiles, format the one or more asset display profiles via an asset display context, and selectively provide the asset display profile or a description thereof (i.e., an asset display description) to one or more of the plurality of output devices. It should be understood that the type and number of output devices depicted in FIG. 1 is not meant to be exhaustive and is for illustrative purposes. Other embodiments may include more, fewer, and/or different input/output devices (e.g., a desktop phone with a visual display device, eyeglasses with a visual display device, etc.).

The network 101 may be any type of communication protocol that facilitates the exchange of information between and among asset management system 150 and the one or more input/output devices. In this regard, the communication protocol may include any type and number of wired and wireless protocols (e.g., any standard under IEEE 802, etc.). For example, a wired connection may include a serial cable, a fiber optic cable, a CAT5 cable, radio frequency (RF) or any other form of wired connection. In comparison, a wireless connection may include the Internet, Wi-Fi, Bluetooth, Zigbee, cellular, radio, etc. In one embodiment, a controller area network (CAN) bus including any number of wired and wireless connections that provide the exchange of signals, information, and/or data. Further, the network 101 may include a local area network (LAN) or a wide area network (WAN), or the connection may be made to an external computer (for example, through the Internet using an Internet Service Provider).

The input/output device 110 may include any type of input/output device including mobile input/output devices (e.g., wearables that permit reception of visual displays, such as a smart-watch; a mobile phone; a tablet computer; a laptop computer; etc.) and non- or predominately stationary mobile input/output devices (e.g., a television or display board mounted to wall, a desktop computer, etc.).

The workplace location 111 general refers to an office or other physical location for a company. However, in other embodiments, the workplace location 111 may refer to a collaborative workspace area, an office space, a cubical arrangement, a shared website, an intranet, and the like. In certain of these embodiments, such as the intranet or website embodiment, the location 111 is the same as the output device 112. Further, in those latter embodiments, the workplace location 111 is a virtual location as compared to a physical location. All such variations are intended to fall within the spirit and scope of the present disclosure. While FIG. 1 depicts only a single workplace location 111, in use, a plurality of workplace locations 111 may be communicably coupled to the asset management system 150.

The workplace location 111 may include one or more output devices 112 that provide a visual, audio, and/or audiovisual display to passerbys in proximity to the output device(s) 112. For example, the output device 112 may include a display device proximate to an entry area corresponding to the plurality of workspace locations; a display device positioned at one of the workspace locations; and a display device positioned at a common area of the workspace environment. The output device 112 may further include, but is not limited to, an electronic picture frame, a display board that welcomes guests when they enter the company's location, display devices (e.g., monitors, screens, etc.) positioned within the location (e.g., in the halls, etc.), and any other display device located within, outside (e.g., a display board on the exterior of the company location), or near the location 111. That is to say, the output device 112 may include, but is not limited to, a smart phone; a laptop screen; a tablet screen; a web site; a data base value provided to an accessible location; a display device associated with an unassigned workspace; a shared display device associated with a work area; a digital whiteboard; a screen saver output; and/or a wait screen, window, and/or picture. In this regard, there may be an overlap between the input/output device 110 and the output device 112. Further, as can be appreciated by the lists above in regard to the devices 110, 112, many output-style devices are contemplated in the present disclosure with all such variations intended to fall within the spirit and scope of the present disclosure.

Many vehicles include display devices included in, e.g., a dashboard of the vehicle. The vehicle 113 may include any type of vehicle 113 that includes one or more display devices capable of receiving an asset display(s) from the asset management system 150. Accordingly, the vehicle 113 may include, but is not limited to, on-road or an off-road vehicle including, but not limited to, line-haul trucks, mid-range trucks (e.g., pick-up truck), sedans, coupes, compacts, sport utility vehicles, and any other type of vehicle that has a display device. In this regard, the vehicle 113 may receive asset displays from the asset management system 150 and permit an operator or other passenger in the vehicle 113 to engage with the displays (e.g., select links corresponding to: a biography of a creator of a particular asset; a business unit for the company associated with the particular asset; view related assets, creators, etc.; etc.). As an example, the vehicle 113 may be configured as a line-haul truck with an operator hauling freight for a particular company. The operator may wish to learn more about freight and/or particular company and can receive asset display descriptions relating to the company.

The advertising display board 114 includes display electronics that facilitate the conversion of transmitted asset display descriptions from the asset management system 150 to display the asset display description on a display device of the board 114. The advertising display board 114 may include any type of electronic advertising display device, such as an display device on mobile transportation (e.g., buses, shuttles, trains, etc.), a billboard, an electronic advertising display board in public spaces (e.g., a monitor within a mall, etc.), a bench having a display (e.g., in a park, near a bus stop, etc.), and the like. In this regard, companies, groups of people, organizations, individuals, etc. may pay or barter for advertising space on one or more of these display boards 114 and, upon completion of the transaction, the asset management system 150 may provide an agreed-to asset display description to the board 114. Rather than the broadcasting of company logos or new products, the asset description profile may provide an indication of the individuals behind a particular product, the evolution of a product in intellectual property terms (e.g., issued patents relating to a "fuel filter" for the past fifty years, etc.), an impact of one or more of the assets (e.g., an environmental impact, such as the subject matter of these patent(s) have led to a decrease in nitrous oxide (NOx) emissions from an engine by over fifty percent relative to an engine without this subject matter; a business impact, the subject matter of these patent(s) have increased profits, stock prices, dividends, and the like by X percent; a company impact, such as that the subject matter of these patent(s) have allowed the company to hire X more people for production, engineering, and the like of this subject matter; etc.). This type of information relates to information that the public may not readily have access to and can lead to an increase in positive perception of the company (or asset display providing entity), facilitate a deeper understanding of a company, and may in turn increase sales for that company, group, or individual.

The asset management system 150 is generally structured to access an asset display profile database comprising a plurality of asset display profiles, select one or more asset display profiles for transmission, format the selected one or more asset display profiles prior to transmission (e.g., remove information that may be subject to a privacy right, such as the asset creator's home address, etc.), and provide the formatted asset display description(s) to one or more output devices. Upon providing, the asset management system 150 may also receive one or more inputs from a viewer of the display to access additional information regarding the provided asset display description(s), screen the input for allowability (e.g., whether the chosen information may be transmitted or not), and selectively provide a response (e.g., "The information requested is subject to a privacy right, such that it cannot be transmitted at this time. Sorry for any inconvenience.") and/or the requested information or a modified portion thereof. These and other features of the asset management system 150 are described more fully herein below.

Figure 2:
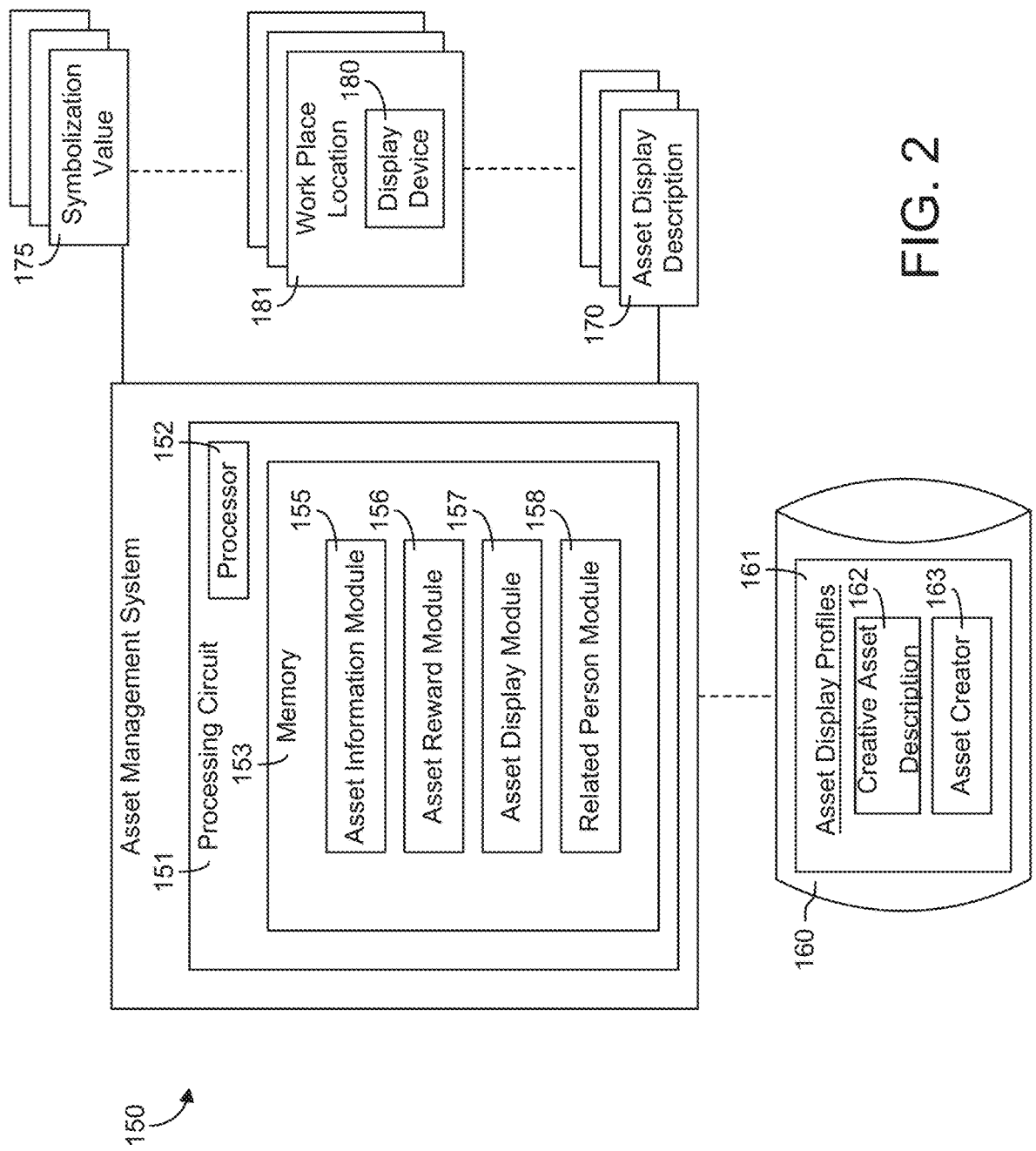
FIG. 2 is a schematic diagram of the asset management system of FIG. 1, according to an example embodiment.

Referring now to FIG. 2, a structure of the asset management system 150 is shown according to an example embodiment. The asset management system 150 may also be referred to as a controller herein and is shown to include a processing circuit 151 including a processor 152 and a memory 154. The processor 152 may be implemented as a general-purpose processor, an application specific integrated circuit (ASIC), one or more field programmable gate arrays (FPGAs), a digital signal processor (DSP), a group of processing components, or other suitable electronic processing components. The one or more memory devices 154 (e.g., RAM, ROM, Flash Memory, hard disk storage, etc.) may store data and/or computer code for facilitating the various processes described herein. Thus, the one or more memory devices 154 may be communicably connected to the asset management system 150 and provide computer code or instructions to the asset management system 150 for executing the processes described in regard to the asset management system 150 herein. Moreover, the one or more memory devices 154 may be or include tangible, non-transient volatile memory or non-volatile memory. Accordingly, the one or more memory devices 154 may include database components, object code components, script components, or any other type of information structure for supporting the various activities and information structures described herein.

The memory 154 is shown to include various modules for completing the activities described herein. More particularly, the memory 154 includes an asset information module 155, an asset reward module 156, an asset display module 157, and a related person module 158. The modules are configured to access, format, and selectively provide asset display descriptions to one or more output devices (e.g., output device 110). While various modules with particular functionality are shown in FIG. 2, it should be understood that the controller 150 and memory 154 may include any number of modules for completing the functions described herein. For example, the activities of multiple modules may be combined as a single module, as additional modules with additional functionality may be included, etc. Further, it should be understood that the asset management system 150 may further control other vehicle activity beyond the scope of the present disclosure.

Certain operations of the asset management system 150 described herein include operations to interpret and/or to determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a computer generated parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

The asset information module 155 is structured to access (e.g., retrieve, receive, interpret, etc.) an asset display profile information set 160 comprising a plurality of asset display profiles 161, each asset display profile comprising a creative asset description 162 corresponding to an associated asset creator 163. As used herein, in one embodiment, an "asset" refers to intellectual property rights or potential intellectual property (IP) rights (e.g., an issued patent versus a pending patent application, etc.). The IP asset may include, but is not limited to, granted patents (both U.S. and/or foreign counterparts), registered and/or unregistered copyrights, registered and/or unregistered trademarks, and/or trade secrets or other confidential and protected information. In another embodiment, an "asset" may refer to any type of award, recognition, accomplishment, and the like. Accordingly, this configuration may include the intellectual property right assets (or exclude the IP assets) and positive recognition generating assets, such as an employee-of-the-month certificate; a safety record for a particular production unit such as 100 days' without an accident award; an award for a salesman, such as highest sales for the first quarter; publications, articles, and the like; and/or any other type of accomplishment. In this regard, the "asset" may refer to internal assets and/or external assets. Internal assets refer to assets received internally through a creator's company, organization, or entity (e.g., employee of the month, etc.) while external assets refer to assets awarded or received externally, such as a granted U.S. patent, a published article, a notable speaking engagement at an area outside of the company, etc.

Accordingly, information relating to the "asset" itself (i.e., the creative asset description 162) may include bibliographic type information including, but not limited to, a genus or general type of the asset (e.g., an IP asset, an internal asset, an external asset, non-IP type assets, etc.), sub-types of the genus type (e.g., U.S. patent applications, foreign patent applications, U.S. issued patents, articles published in X magazine, etc.), any date information pertaining to the asset (e.g., issue date of the U.S. patent, filing date of the U.S. patent application, a timeline, etc.), and the like.

The asset display profile 161 may also include associated information relating to the corresponding asset and also a part of the creative asset description 162. The associated information may include at least one of an internal and an external impact of the asset. Internal impact information may include any impact/effect that the asset had internally, such as how many jobs the asset directly or indirectly created, revenue generated indirectly or indirectly from the asset, an associated division of origin for the asset (e.g., business unit, sector, etc.), a timeline of development of the asset (e.g., an initial thought session followed by an invention disclosure followed by a patent application followed by an issued patent, etc.), and the like. External impact information may include how the asset has affected/impacted entities outside of the associated entity, such as an environmental impact (e.g., this patent is focused on technology that is a part of a green technological product line intended to reduce engine NOx emissions by X percentage by year 20XX) and/or any other type of external impact (e.g., media recognition of the IP asset or product associated with the IP asset, etc.).

The asset display profile 161 may also include information relating to a creator (or creators) 163 of the asset. The information 163 may include any type of bibliographic information relating to the creator(s). The bibliographic information may include, but is not limited to, a legal name, nickname, address information, phone number information, personal/work e-mail address information, title, position, preferred contact manner, etc. The information 163 may include a "living profile" that dynamically updates/changes with time and events (e.g., the change from a pending patent application to an issued patent may be update in their profile, new awards/recognitions may be dynamically added to their profile, etc.). Similarly, the asset itself may also be dynamically updated (e.g., additional recognition information relating to the asset, impact information, etc.). In this regard, the asset display set 160 may be a dynamic entity.

Thus, the term "asset display profile" is intended to refer to any and all type of information relating to a particular asset.

The asset reward module 156 is structured to determine an asset display context responsive to a selected, chosen, and/or identified asset display profile(s) 161. Selection and/or identification of asset display profile(s) 161 for transmission are described herein below in regard to the asset display module 157. The "asset display context" refers to the parameters that define the asset display description provided to an output device. Accordingly, the asset reward module 156 may include one or more input/output devices (e.g., a computer, etc.) that facilitate the selection or identification of the parameters that define the asset display description to-be provided to an output device. In another embodiment, the asset reward module 156 may include communication circuitry that facilitates the exchange of information to receive and store the parameters.

In one embodiment, the parameters that are used to determine an asset display context are based on one or more information security policies. The information security policies may include privacy information restrictions as well as information specifically chosen to be excluded. For example, privacy information restrictions may exclude any information relating to the contact information of the creator(s) (e.g., his/her home address, home phone number, personal and/or work e-mail address, etc.). Further, information chosen to be excluded may include company-sensitive information (e.g., some or all of the internal impact information described above, such as the revenue generated directly or indirectly from the particular asset), which of course may be highly configurable from application-to-application. For example, sensitive information may include internal reference numbers used to identify the asset, related patent applications that are not yet publicly available, creator(s) or other related people who specifically choose to be excluded from the display description, etc. In another example, in one embodiment, a user may simply request that any information in the asset display profile 161 may be provided consistent with a maximum permitted amount of the associated information security policy. A "maximum" may refer to one or more external legal guidelines, policies, rules, etc. and specific to the type of information (e.g., privacy rights concerning the creator(s), etc.). A maximum may also refer to one or more internal policies and/or guidelines (e.g., what type of asset information a company is comfortable with displaying to the public). A maximum may further refer to a combination of internal and external policies, guidelines, rules, laws, etc. that prescribe what asset information can and cannot be provided to an output device. A "maximum" may still further refer to a user-controlled type of information that may be displayed at one or more output devices. In this configuration, in somewhat of a piecemeal fashion, a user may selectively indicate which pieces may and may not be included in the asset display context. Accordingly, the term "maximum" in regard to the type of asset information that may be determined via an asset display context consistent with an information security policy is meant to be broadly interpreted, with all such aforementioned and other variations intended to be included in the scope.

In another embodiment, the parameters that are used to determine an asset display context are based on the recipient or target output device. In this regard, output devices may have different display characteristics (e.g., size, contrast, video-capability, ability to receive an input, etc.) that impact the asset display context. For example, a mobile device may have a relatively smaller screen size than other output devices (e.g., a desktop computer monitor, a billboard, etc.), such that the asset display description provided to the mobile device may differ from that provided to the billboard. In one embodiment, the asset reward module 156 may include one or more filters, look-up tables, and/or operational processes that define the asset display context responsive to the characteristics of a selected output device(s). The asset reward module 156 may further include a ranking, priority, and/or hierarchical categorization for each or most of each type of information, with such hierarchical categorizations used to formulate the asset display context. The hierarchical categorizations may be used in combination with specific target output devices. An example may be an IP asset, namely, a granted U.S. patent. Among other pieces of information, the asset display profile may include the following, with the numbers used to show the hierarchical ranking of the information: 1) Title of Patent, 2) Inventor Name, 3) Associated Business Unit of Origin, 4) environmental impact, 5) Related Product, and 6) Importance to the Company (e.g., a short narrative summary regarding the asset). If a mobile device (e.g., a smartphone) and a welcome display screen 112 in a workplace location 112 are the selected output devices, the display context may only include information items 1)-3) for the mobile device while the display context for the display screen 112 may include all six of the asset profile information pieces.

In still another embodiment, the parameters that define the asset display context may be specific to the type of asset. For example, a granted U.S. patent asset may have different parameters than an employee-of-the month asset (e.g., the granted U.S. patent may have information relating to the inventor, the issue date, the related product, a related business unit, etc. whereas the employee-of-the-month asset may simply correspond with an employee name, pertinent date, reasons for selection, etc.). Accordingly, in this regard, the nature of the difference in asset types may dictate the formatting utilized to determine the asset display context.

Figure 3:
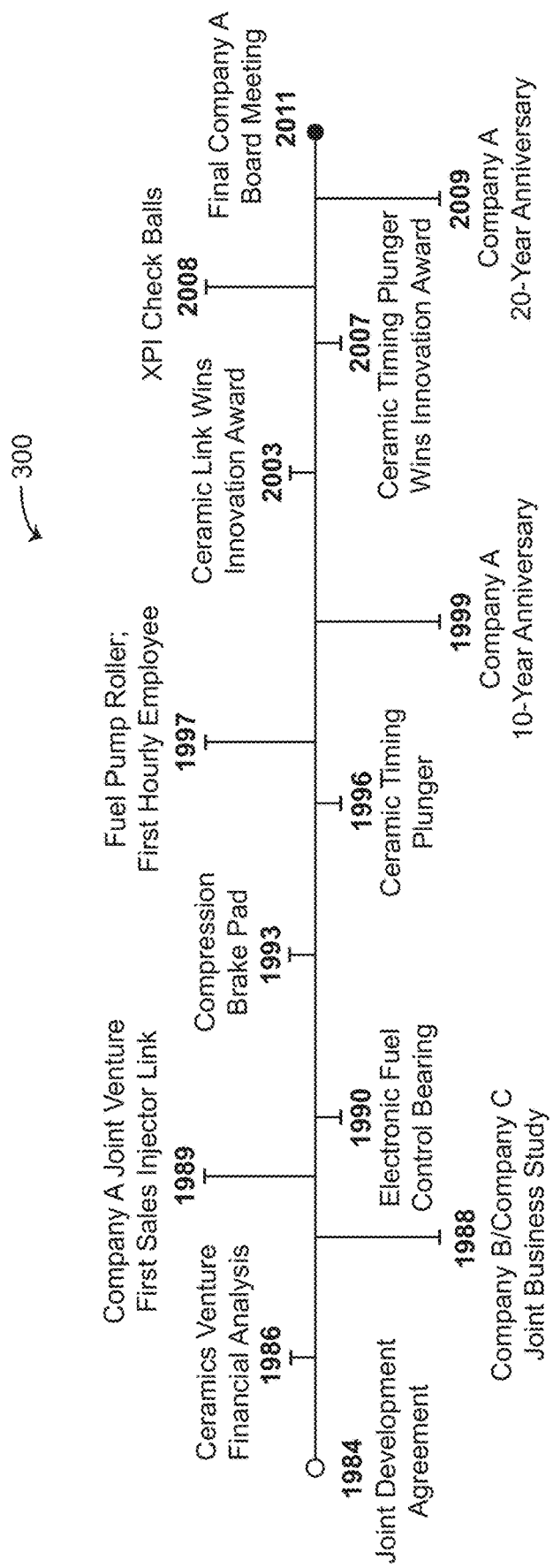
FIG. 3 illustrates a timeline of related assets, according to an example embodiment.

In a further embodiment, the parameters that define the asset display context may be based on a format for the to-be provided asset display description. For example, referring now to FIG. 3, a timeline of related assets is shown, according to one embodiment. In FIG. 3, the IP assets are related to a particular product. "Relating" as it pertains to asset and information contained in the asset display profile is described herein below. In FIG. 3, the timeline 300 is provided to a selected output device. To avoid clutter in the timeline, the timeline 300 may only include a patent issue date, an inventor name, and a short description of what the patent relates to. These parameters define the asset profile display context and are used to determine the asset display description—the timeline 300.

The asset display context may further be based on the reason why the asset display profile was or is to be displayed. For example, the asset display profile may include company-sensitive information only intended for company employees. However, a creator of a particular asset may be bringing in a potential client and wants to market the creator's skill in the form of a displayed asset description. In which case, the asset display context may filter out any company-sensitive information from the asset display profile. Further, the asset display context may tailor the asset display profile to appease or attempt to appease the interests of that customer. For example, if the potential customer is environmentally conscientious, the asset display context may focus on the environmental impact of the particular asset. In this regard (and in regard to the other parameters of the asset display context and the relationship features), the asset display context may be limited by the "richness" of the set of asset display profiles 160 and the information included within each profile 161. The more data or information included, the more options the asset display context provides a user to customize a particular asset display description.

The asset reward module 157 is further structured to determine and arrange a plurality of assets. The arrangement may be based on one or more relationship features or characteristics. In the example above, the relationship feature is the particular product, such that upon selection of the particular product, the corresponding assets are accessed, obtained, or retrieved. Relatedly, the relationship feature may also be based on a particular subject matter. For example and in regard to an exhaust aftertreatment system and engine manufacturing company, an asset display context may be utilized to filter the asset display profiles 161 by relating to the exhaust aftertreatment system.

In another example, the relationship feature may be a particular creator of the asset. For example, with a brief reference to FIG. 6, table 640 depicts the invention disclosures relating to a particular inventor. However, the related creator information may go beyond the other related invention disclosures. For example, publications, other awards, etc. may also be associated with a particular creator, wherein these other publications, awards, and the like may be used to define an asset display context for an asset display profile.

These recognitions may be updated dynamically as described in regard to the "living profile" herein above.

The relationship feature may be based on people, teams, and/or groups related to an associated creator. For example, the asset display context may apply a filter that accesses all asset display profiles 161 including team members for a particular team or teams. The asset display context may further apply a filter to access only those asset display profiles relating to a particular business unit of a company (or, in some embodiments, a group of related business units).

The relationship feature may be based on a particular timeframe of interest. For example, the asset reward module 156 may apply an asset display context to limit IP assets from only 2004-2010, where the asset display module 157 forms an asset display description (e.g., a timeline) of those IP assets and provides the asset display description to a selected output device.

The relationship feature may be based on a geographical location. For example, a company may have offices in Milwaukee, Cincinnati, and Montpelier. The Montpelier location may have a welcome display device that they wish to advertise or market the IP assets originated in Montpelier. Accordingly, the asset information module 155 may access the asset display profile information set 160, the asset reward module 156 may apply an asset display context to access or retrieve only IP assets with a Montpelier origin, and the asset display module 157 may provide an asset display description of the IP assets with a Montpelier origin to the display device in the Montpelier. For example, the asset display description may be provided in the form of a timeline to show the history of research and development at the Montpelier location.

The relationship feature may also be based on parameters, such as external and internal impact. For example, an operator of a display device in a cafeteria of a company may wish to broadcast/display the IP assets with the largest impact on the company. The impact may be financially (e.g., revenue generated, etc.), personnel-related (e.g., number of jobs created, etc.), and any other type of internal impact filter. The asset reward module 156 may apply an asset display context to the set of asset display profiles 160 to retrieve the asset display profiles matching the above criteria, which are provided by the asset display module 157 to the display device in the cafeteria as asset display description.

It should be understood that while explained individually, the asset reward module 156 may use one or more of the parameters and relationship features described above collectively determine the asset display context. Further, in certain embodiments, one or more relationship features may be applied after-providing of the asset display description. In this regard, those one or more relationship features may represent a second order data value for enhancing engagement of the asset display description on the output device. The second order data value can comprise at least one data value selected from the data values consisting of: a plurality of assets in related subject matter areas, a plurality of assets created by related business units, a plurality of assets created by creators of the associated asset creator(s) corresponding to the creative asset description, and an award corresponding to the creative asset description. For example, a timeline of patents may be initially provided regarding a certain product. A user may click on an inventor associated with a particular patent to view inventor-specific information (e.g., how long they have been with the company, other inventions related to the inventor, etc.).

The asset display module 157 is structured to provide an asset display description 170 to the visual output device 180 that may be separate from or included with one or more work place locations 181 in response to the asset display profile and the asset display context. The visual output device 180 may include any of the type and structure of output devices described above in FIG. 1. Similarly, the one or more work place locations 181 may have the same description as the workplace 111 in FIG. 1; different reference numerals are used for clarity in FIG. 2. In one embodiment, the asset display module 157 may include the display device for displaying/providing the creative asset display description 170. In another embodiment, the asset display module 157 may include communication circuitry configured to communicate the asset display description to the output device(s).

The output device 180 may be predefined based on a user input (i.e., selected or chosen). In another embodiment, the output device may be a part of a larger transaction, such as a contract as in the example above in regard to the billboard. In certain embodiments, a user of the asset management system 150 may have a variety of choices of output devices and selectively choose the output devices of interest (consequently, each chosen output device may define a different asset display context that is applied).

Figure 4:
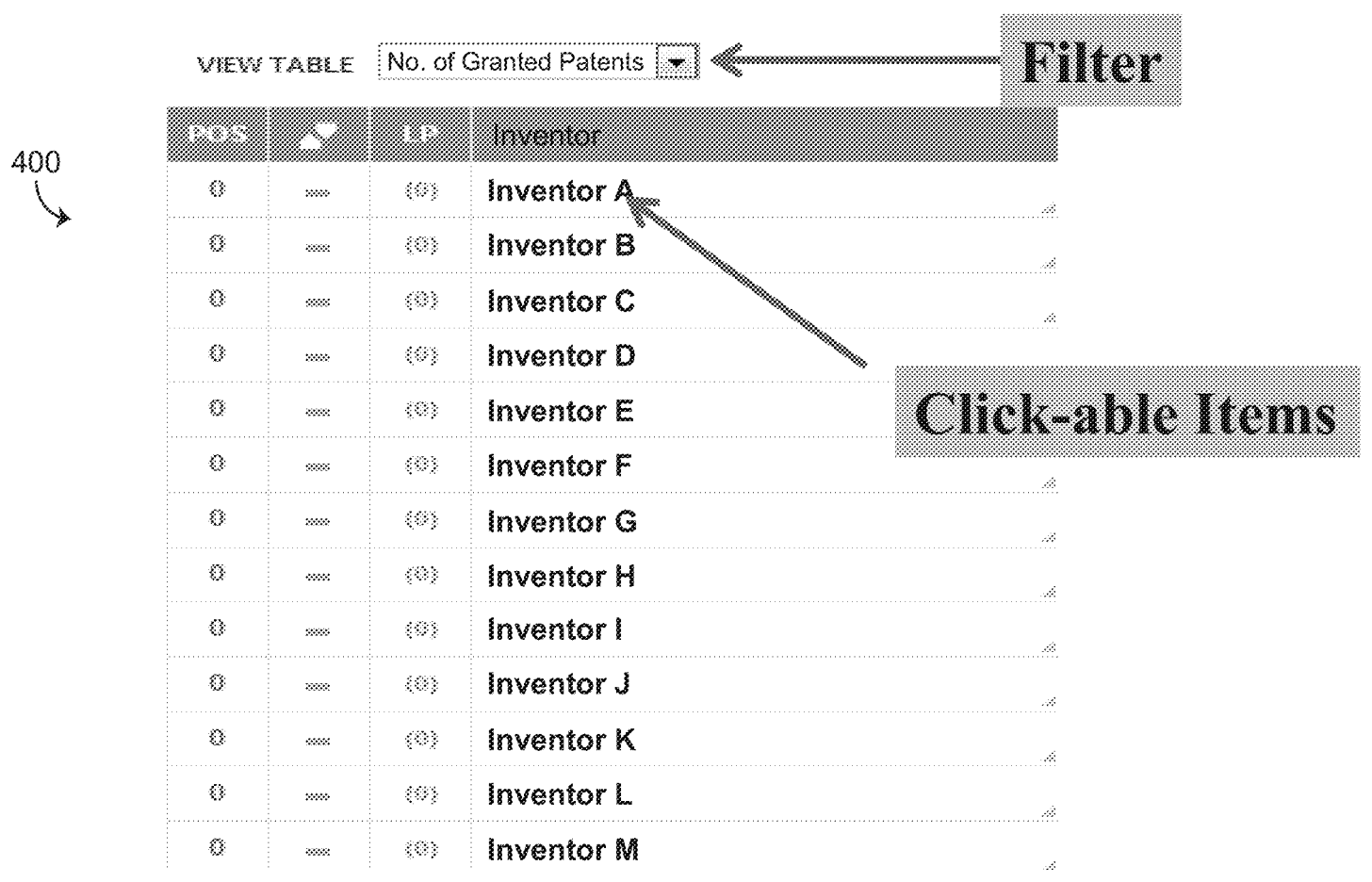

The phrase "asset display description" refers to the intended and/or actual asset display of the asset display profile. For example, the timeline 300 represents an asset display description for a group of related IP patent assets. In another example, FIG. 4 depicts a table 400 relating to the selected or chosen asset. In another example and in regard to an IP patent asset, the asset display description may include a graphical representation of a front page of a patent application and/or issued patent; a digitally enhanced front page of a patent application and/or issued patent; an asset summary description (e.g., "This asset relates to Product X, which was released in Year Y and sold throughout the world.", etc.); an asset summary description provided in a surrounding context, the surrounding context comprising at least one context consisting of a surrounding group of related assets, a surrounding group of related content creators, a surrounding group of asset creation entities, an asset creation timeline, and an asset value schedule, a surrounding group of related assets; a surrounding group of related content creators; a surrounding group of asset creation entities; an asset creation timeline; and an asset value schedule; an asset award description; etc. In this regard, the term "related" as used to define and describe the surrounding context may be have the same definition as provided herein.

In one embodiment, the asset display description 170 may include a snapshot of the total asset display description (e.g., a representative image of the asset display description). The asset display module 157 may utilize this function if the asset display description is being sent as part of an advertising campaign. For example, a slideshow may include a plurality of snapshots associated with a plurality of asset display descriptions. If provided to a computer, a user may selectively "click" on the snapshot of interest to view the total asset display description and any selectable links, objects, or elements included therewith. The asset display description may also include a symbolization value 175 for display in at least one of: an e-mail signature, an intranet directory entry, an internet directory entry, a messaging signature, a physical and/or virtual business card, a computing device surface display, a computing device screen saver display, a computing device resting state display, an electronic picture device display. The symbolization value 175, like the snapshot, may provide a representative image, audio, etc. of the asset display description. In another embodiment, the example symbolization value 175 includes at least a portion of the asset display profile 161. This is the example depicted in FIG. 2 with the symbolization value 175 separated from the asset display description 170. Example and non-limiting symbolization values 175 include an icon, a stylized representation, a picture, a quotation, graphics positioned in relation to these, and/or user-selected ones of these. An example symbolization value 175 includes a patent plaque icon with a patent number depicted thereupon. Another example symbolization value 175 includes a quotation relating to the merits of the asset, such as a statement from an award received by the asset creator relating to the asset, a quotation from the asset specification (e.g. a benefit of the asset stated within the text of a document filed related to the asset), with framing graphics positioned in relation to the quotation, and/or a stylized representation of an amount of emissions prevented to date due to products created utilizing the asset. The provided examples of symbolization values 175 are non-limiting, and one of skill in the art having the benefit of the disclosures herein can prepare a symbolization value having knowledge generally available to them when contemplating a particular asset, a corresponding asset display profile, a target output device 112, and/or a target recipient of the symbolization value 175. In certain embodiments, both the symbolization value 175 and the content from the asset display profile 161 to be included in the symbolization value 175 are selectable by a user (e.g. the asset creator).

These examples are not meant to be limiting as the asset display description 170 may include a variety of different formats (e.g., an animation showing the evolution of a product as a function of the associated IP assets, a slideshow presentation relating to a particular asset, etc.). As mentioned above, each such format may have one or more parameters that define the display context and, in turn, format the asset display profile for interfacing with the selected output device. For example, a web site may facilitate a relatively greater amount of input/output capabilities (described below) than a billboard. In another example, a mobile device may permit accompanying audio while a billboard does not.

Figure 5:
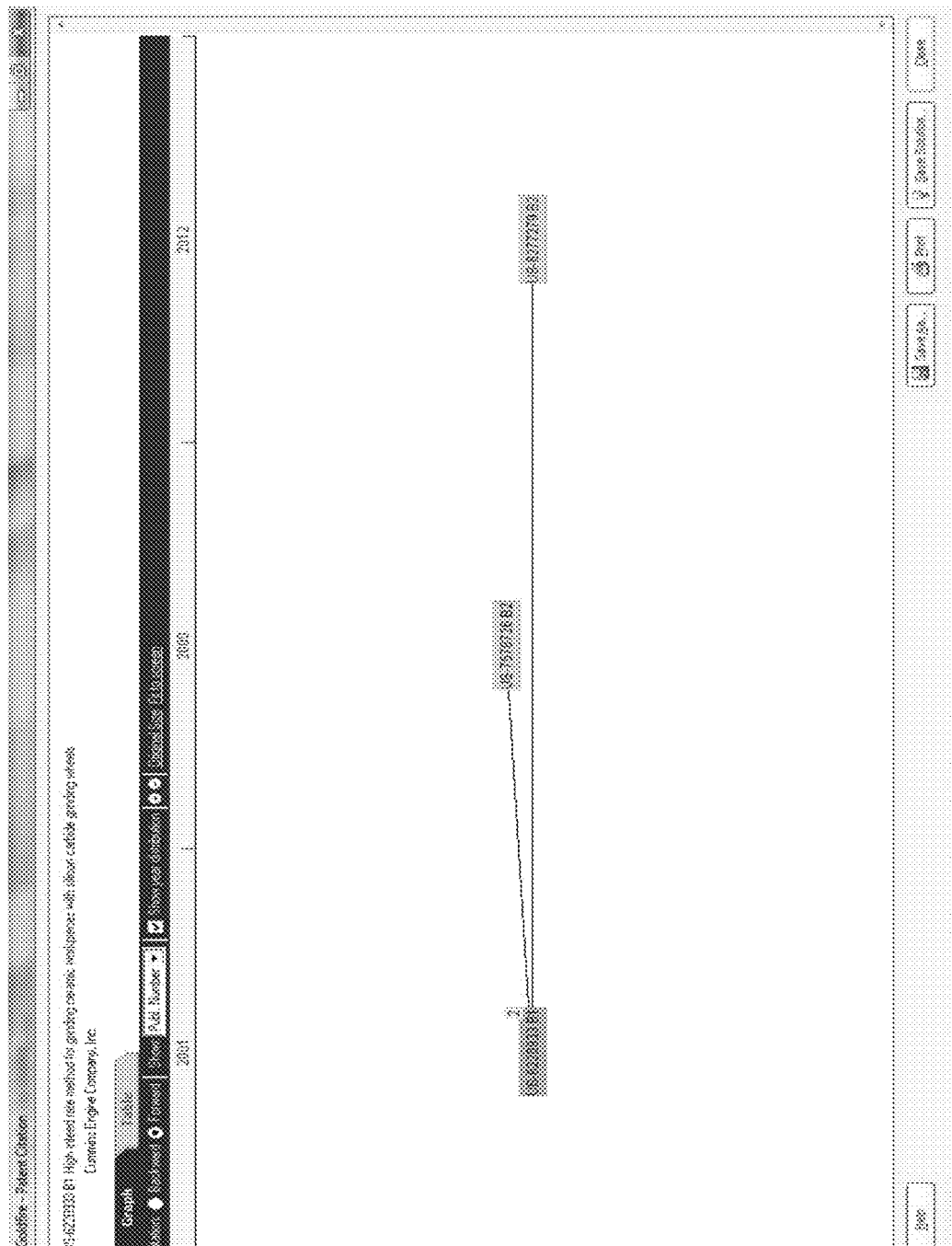
FIG. 5 illustrates an inventor-specific timeline of their associated patent assets, according to an example embodiment.

In certain embodiments and as briefly alluded to above, the asset display description may provide dynamic manipulation. That is, depending on the output device the asset display description is provided to, the output device may provide an interface to facilitate an input by the user regarding the asset display description thereby resulting in an enhanced interface. That is to say, one or more pieces of information included in the asset display description 170 may include selectable links to further research, view, or examine information pertinent to the selected link. Example grouping/relationship activities are described above in regard to the asset reward module 156. A pictorial example is shown in FIG. 5, which depicts an inventor-specific timeline of their associated patent assets. The graph 500 may have been created by the asset display module 157 in response to a user selecting a particular inventor shown on the timeline 300. As a marketing tool, the associated creators/inventors may show others a global view of the product they worked on (e.g., timeline 300) and then their specific contributions, as shown in graph 500.

Figure 6:
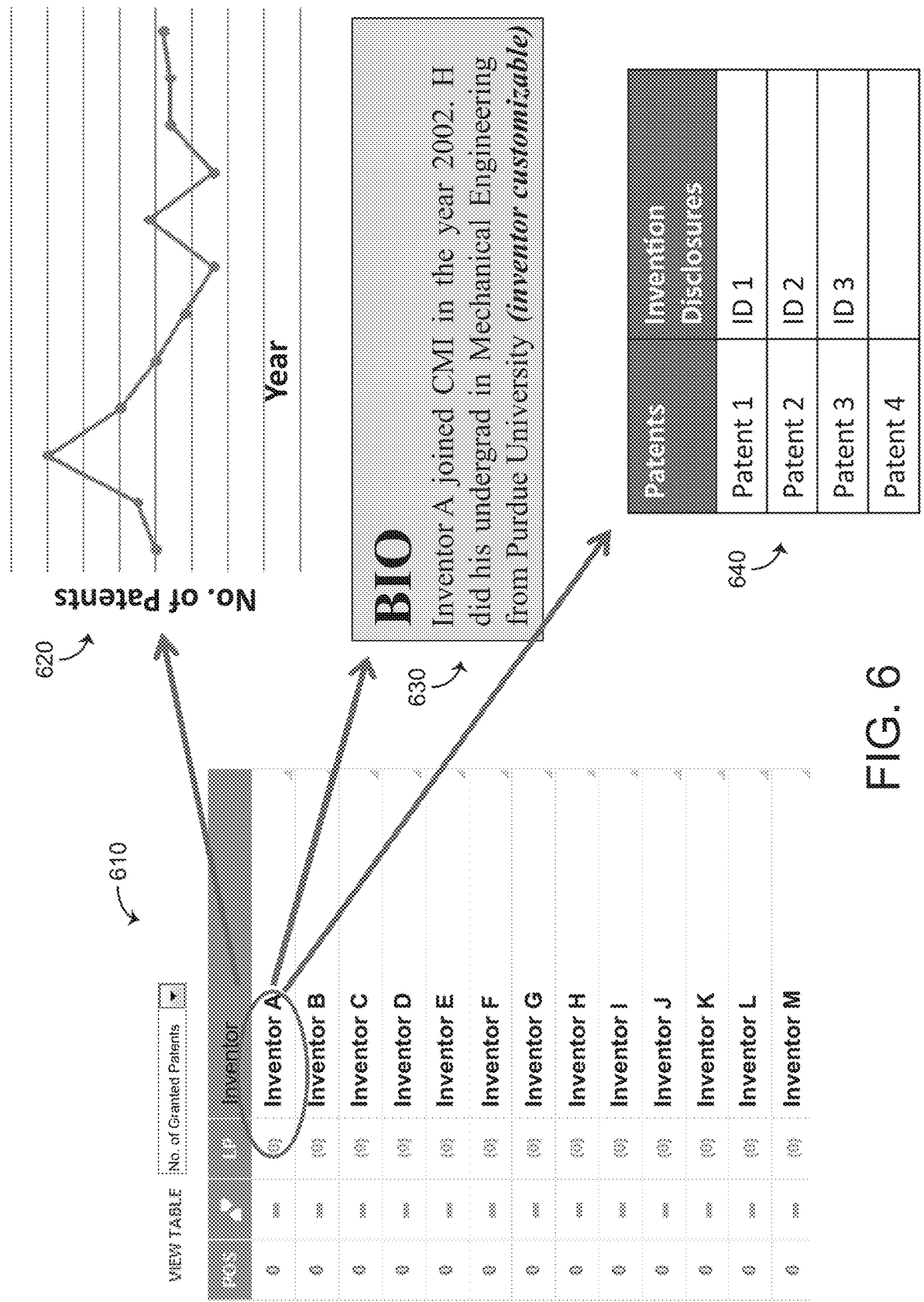
FIG. 6 illustrates an asset display description linked to several related asset display descriptions, according to an example embodiment.

In another example, referring now to FIG. 6, a table 610 of inventors of a U.S. patent are shown. The table 610 may be generated from selection of a U.S. patent in the timeline 300. From table 610, a user may select a particular inventor to view their biography 630 and their IP portfolio including a timeline 620 of patents and a table 640 of invention disclosures that the inventor is related to (e.g., as a listed inventor, a subject matter expert, etc.). In this regard, a user may examine the IP activity of a particular asset.

The related person module 158 is structured to determine a proximity of a related person to a visual output device. As mentioned above in regard to relationship features, a related person of a corresponding asset may include, but is not limited to, associated asset creator, a person working in the same group as the associated asset creator, a person working in the same business as the associated asset creator, a supervisor of the associated asset creator, a person supervised by the associated asset creator, a person appearing in an e-mail list (e.g., in at least one of the To, CC, or BCC lines) of the associated asset creator, a person predetermined by the associated asset creator, a person predetermined by a marketing person working in the same business as the associated asset creator, and a person predetermined by any one or more of the persons preceding or appearing in an e-mail list of any one or more of the persons preceding. The related person may further include customers, vendors, suppliers, distributors, etc. associated with a particular asset or piece of information relating to the asset (e.g., all of the suppliers of parts for products associated with a creator, etc.). The present disclosure contemplates the inclusion and/or exclusion of any or all of these people as related persons.

The related person module 158 may include or utilize at least one detection mechanism including, a camera(s) coupled to facial detection and identification computer products, a fingerprint scanner, an eye scanner, and the like. In another embodiment, these detection mechanisms may be in communication with but separate from the module 158. The above-noted detection mechanisms permit the automated identification (e.g., automatic) of a person, which the asset reward module 156 may use to determine the asset display context.

The detection mechanisms may also include non-automatic mechanisms. The non-automatic features may include card or badge readers (e.g., at various security gates, a visitor may scan their badge which facilitates the identification of the visitor(s) and the asset display description provided to display devices nearby), an affirmative input by an operator of an output device, and the like. Each of the automatic and non-automatic (or combinations thereof) facilitate the identification of a related person to provide a custom or tailored asset display description based on the identification.

As mentioned above, the related person module 158 is also structured to determine a proximity of a related person to a visual output device. Thus, the related person module 158 includes an identification feature and a proximity feature. "Proximity" as used in regard to describing an operation of the related person module 158 is meant to be broadly interpreted. The term proximity may refer to a predefined geographical distance relative to a visual output device. For example, the related person module 158 may have identified a particular asset creator (e.g., an inventor) when he/she swiped their badge to enter the building while an output display device is located within a viewing area of the entry area, such that the asset display description provided to the output display device corresponds to the particular creator. Companies may use this strategy to self-motivate their employees. In another example, a hall sensor may have detected movement within an area within a viewing area (e.g., ten feet, thirty feet, etc. depending on the size, contrast, and location of the display device) of the display device, which an asset display description is then provided too. In this example, a predefined asset display description may be provided to the display device. The output display device may also include a sensor for detecting individuals nearby. The individuals nearby may be equipped with an identifier corresponding to their identity, such that upon detection, the asset management system 150 also identifies the particular person(s). In which case, tailored asset display descriptions may be readily provided. Proximity may also refer to a same security clearance location (e.g., one area may have its own corresponding security clearance with multiple output devices such that once a particular individual is sensed, all or some of those output devices may be provided with the asset display description(s)). Proximity may further refer to a visual proximity as compared to a predefined distance from the output device. In certain embodiments, several output devices may be included in a location, where proximity refers to a predefined walking time between the output devices. In this case and as an example, Creators A and B may have been identified via a badge swipe with Creator A entering a hallway comprising several output devices before Creator B. Based on when each creator entered, a walking gait timer may be used to determine when each output device receives a specific asset display description tailored to Creator A or B. In some embodiments, proximity may include aspects of one or more of the aforementioned definitions.

Of course, for mobile display devices especially those associated with a person (e.g., a smartphone belonging to a person), the above formulations of proximity may be largely non-applicable.

The asset reward module 156 is structured to determine the asset display context in response to the proximity of the related person to the visual output device. In the above example, because Creator A is likely to reach the each of the various output devices first, asset display descriptions relevant to Creator A are provided to each of the output devices in advance of any asset display description relevant to Creator B being provided.

Figure 7:
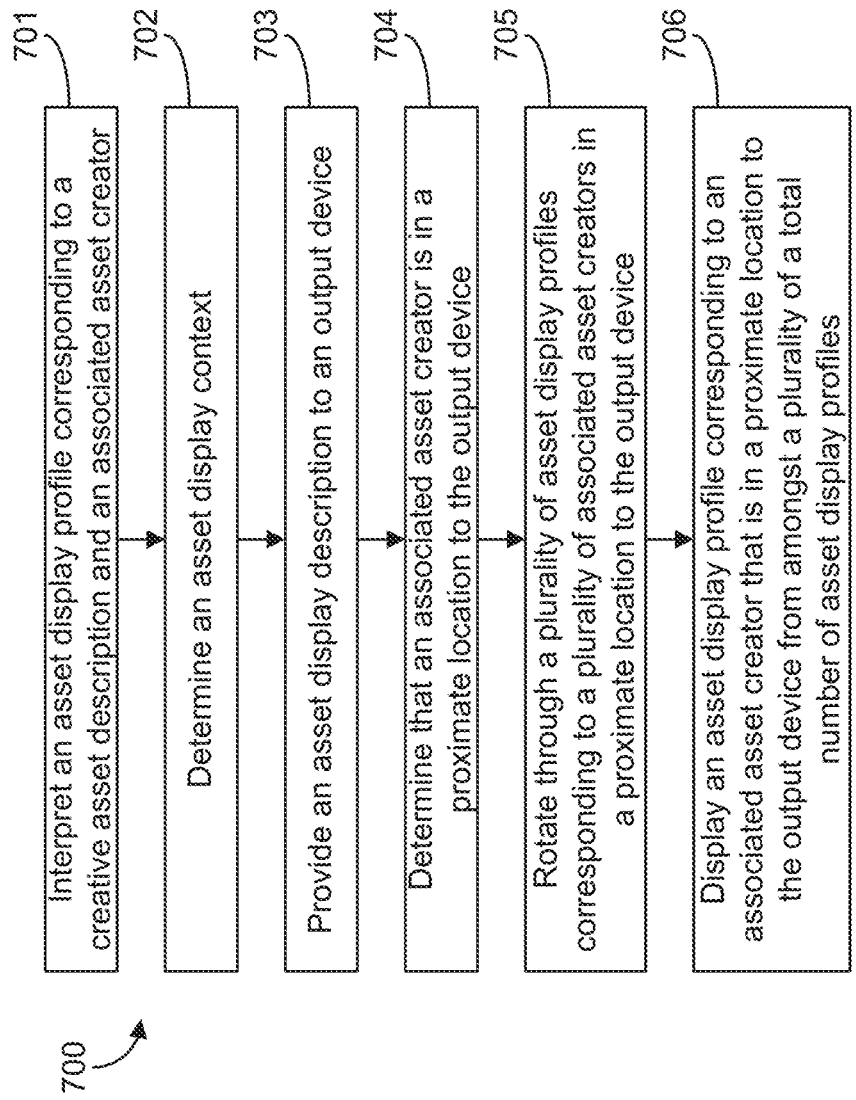
FIG. 7 is a flowchart of a method of providing an asset display description, according to an example embodiment.

With the above description in mind, an example flowchart of providing an asset display description is shown in FIG. 7. As the operations of process 700 may be implemented by one or more modules of the asset management system 150, reference may be made to components of FIGS. 1-2 to aid description of process 700.

Figure 8:
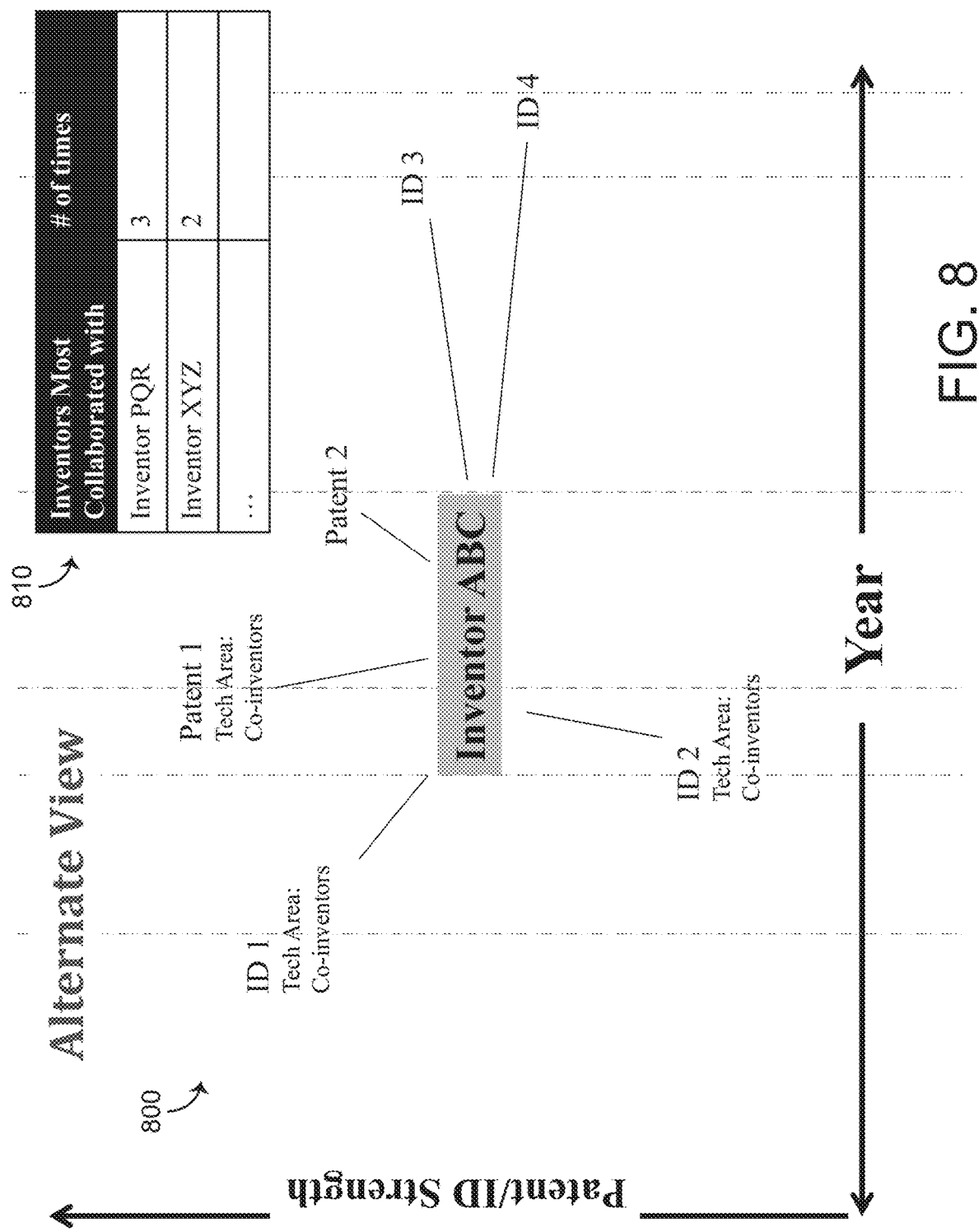
FIG. 8 illustrates an asset display description, according to an example embodiment.
Figure 9:
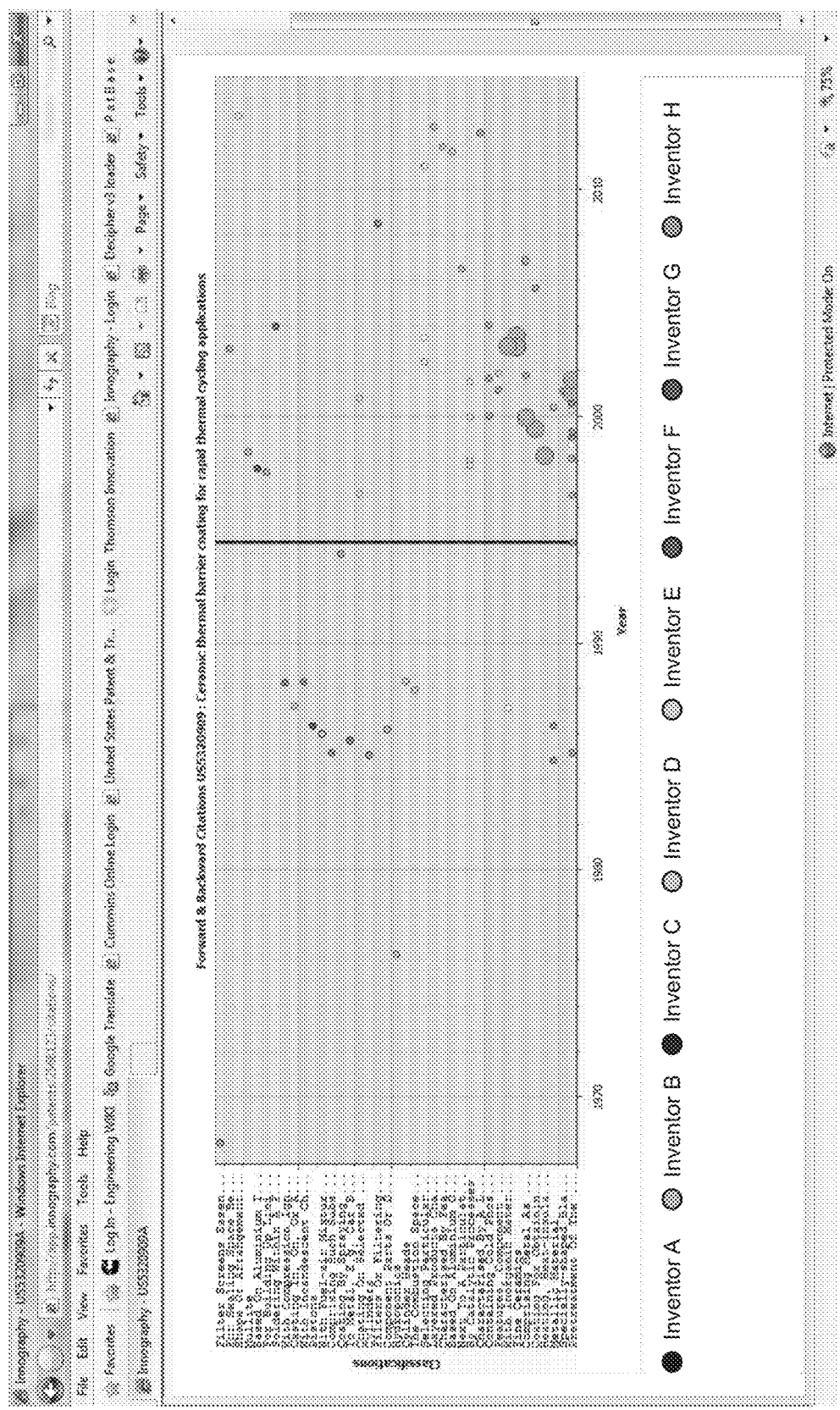
FIG. 9 illustrates an asset display description, according to an example embodiment.

At process 701, an asset display profile, such as asset display profile 161, corresponding to a creative asset description, such as creative asset description 162, and an associated asset creator, such as associated asset creator 163. A display context is determined (702). As mentioned above, the display context refers to the parameters used to format the asset display profile (e.g., filters used to remove pieces of information, such as the audience (e.g., internal or the public), etc.). Responsive to the determined asset display context, an asset display description is provided to an output device (e.g., a monitor, a website, a mobile phone, a laptop computer, etc.) (703). FIG. 8 illustrates an asset display description, according to one embodiment. In FIG. 8, a timeline 800 display focused on the IP activities of a particular inventor is shown. A related feature has been applied to generate table 810 showing which inventors the particular inventor of interest in the timeline 800 has collaborated most frequently with. In FIG. 9, another asset display description is shown according to one embodiment. Compared to FIG. 8, the graph 900 shows all of the patent assets relating to a particular product with the associated inventor names for each patent asset below the graph 900. A user can click on the patent to highlight the associated inventors or click on the inventors to highlight the associated patent assets. The user may further be able to navigate to, e.g., a one or more tables like shown in FIG. 6 to gain more information, if desired (e.g., table 620, table 630, etc.). While the above-mentioned steps describe the general providing of the asset display description to an output device, the following steps are relatively more specific to a custom providing of the display description.

At process 704, the associated asset creator is determined to be in a proximate location relative to the output device. As mentioned above, proximate may refer to within a predefined physical distance, within a visual distance of the output device, etc. In another embodiment, in addition to or in place of, a related person—as defined above—may be determined to be in a proximate location relative to the output device. The related person may be the creator's supervisor, a customer, a marketing person, etc. The related person identified may dictate the asset display context (e.g., only public sanctioned information may be provided to a customer whereas internal information that is not sanctioned to be provided to the customer may be generally provided to employees in the workplace location). The asset display description can be provided to the output device in response to the determining the associated asset creator (or related person) is in the proximate location to the output device.

In certain embodiments, several asset creators or audiences chosen to be the subject of marketing (and therefore to be provided with the opportunity to view one or more asset display descriptions) may be identified to be in a particular area. The particular area may include one or more output devices. At process 705, the asset information module 155 may cycle through a plurality of asset display profiles corresponding to the plurality of associated asset creators (or related persons/target audiences) in a proximate location to the output device. At process 706, an asset display profile corresponding to an associated asset creator that is in a proximate location is selected from amongst a plurality of a total number of asset display profiles and is provided to the output device for display.

While processes 705-706 relate to providing asset display profiles to asset creators or related persons in proximate location to the output device. Other embodiments may use different preference types for determining which asset profile and description thereof to provide. Preference types may include a hierarchy in the company (e.g., a supervisor is given more weight than an employee, such that assets relating to the supervisor are preferentially shown over those relating to the employee), a value of an asset (value can be measured from money generated from the asset, importance/relation to a company value(s), importance/relation to the audience such as an emissions impact of an asset may be displayed because the audience are members of an emissions certification board, etc.), a rotation of assets related to current programs/projects, recent assets shown, etc. The foregoing preference types are not meant to be limiting or exhaustive as the present disclosure contemplates other preference types intend to fall within the spirit and scope of the present disclosure.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

Example and non-limiting module implementation elements include sensors (e.g., sensors 140) providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in machine-readable medium for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in machine-readable medium (or computer-readable medium), the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone computer-readable package, partly on the user's computer and partly on a remote computer or entirely on the remote computer or server.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed:

1. A method, comprising:
   identifying a plurality of workspace locations, each of the workspace locations comprising a visual output device;
   identifying a plurality of output devices;
   interpreting a plurality of intellectual property asset display profiles corresponding to a plurality of intellectual property creative asset descriptions based on an associated intellectual property asset creator and a related person to the associated intellectual property asset creator, the related person being in a same business unit of a company as the associated intellectual property asset creator, being in a same group of the company as the associated intellectual property asset creator, or being at least one of a customer, a vendor, or a supplier associated with the associated intellectual property asset creator;
   detecting a badge scan associated with a person;
   determining a location and an identity of the person based on the detected badge scan associated with the person, the identity of the person being the related person or the associated intellectual property asset creator;
   dynamically selecting an output device from the plurality of output devices and the visual output device of each workspace location based on the determined location from the detected badge scan;
   determining an intellectual property asset display context based on the determined identity and location of the person; and
   in response to the plurality of intellectual property asset display profiles and the intellectual property asset display context, providing an intellectual property asset display description to the selected output device that cycles through the plurality of intellectual property asset display profiles to change a display of the selected output device, wherein the selected output device includes a visual output device associated with an unassigned workspace.

2. The method of claim 1, wherein the intellectual property asset display description comprises at least one display description selected from the display descriptions consisting of:
   a front page of a patent application and/or issued patent;
   a digitally enhanced front page of a patent application and/or issued patent;
   an intellectual property asset summary description;
   an intellectual property asset summary description provided in a surrounding context, the surrounding context comprising at least one context consisting of: a surrounding group of related intellectual property assets; a surrounding group of related content creators; a surrounding group of intellectual property asset creation entities; and an intellectual property asset creation timeline;

an intellectual property asset award description;

a symbolization value for display in at least one of: an e-mail signature, an intranet directory entry, an internet directory entry, a messaging signature, a physical and/or virtual business card, a computing device surface display, a computing device screen saver display, a computing device resting state display, an electronic picture device display; and a formatted description configured for interfacing with a specified format, web site, job service, or the like, wherein the formatted description is structured to provide the maximum allowable information regarding the creative intellectual property asset consistent with an information security policy.

3. The method of claim 1, further comprising:

interpreting at least one second order data value in response to the intellectual property asset display description;

determining an enhanced interface intellectual property asset description in response to the second order data value, the plurality of intellectual property asset display profiles, and the intellectual property asset display context; and providing the enhanced interface intellectual property asset description to the selected output device.

4. The method of claim 3, wherein the second order data value comprises at least one data value selected from the data values consisting of: a plurality of intellectual property assets in related subject matter areas, a plurality of intellectual property assets created by related business units, a plurality of intellectual property assets created by creators corresponding to the creative intellectual property asset description, and an award corresponding to the creative intellectual property asset description.

5. The method of claim 1, wherein the intellectual property asset display description includes a graphical display provided on the selected output device.

6. The method of claim 1, wherein the provided graphical display on the selected output device comprises at least one operation to provide the graphical display selected from the operations consisting of displaying:

a front page of a patent application and/or issued patent;

a digitally enhanced front page of a patent application and/or issued patent;

an intellectual property asset summary description;

an intellectual property asset summary description provided in a surrounding context, the surrounding context comprising at least one context consisting of: a surrounding group of related intellectual property assets; a surrounding group of related content creators; a surrounding group of intellectual property asset creation entities; and an intellectual property asset creation timeline;

an intellectual property asset award description;

a symbolization value for display in at least one of: an e-mail signature, an intranet directory entry, an internet directory entry, a messaging signature, a physical and/or virtual business card, a computing device screen saver display, a computing device resting state display, an electronic picture device display; and a formatted description configured for interfacing with a specified format, web site, job service, or the like, wherein the formatted description is structured to provide the maximum allowable information regarding the creative intellectual property asset consistent with an information security policy.

7. The method of claim 5, wherein the provided graphical display on the selected output device comprises at least one operation to provide the graphical display selected from the operations consisting of:

cycling through the plurality of intellectual property asset display profiles in a proximate location to the selected output device;

cycling through the plurality of intellectual property asset display profiles in a geographic region corresponding to the selected output device;

preferentially displaying an intellectual property asset display profile in a proximate location to the selected output device from amongst the plurality of intellectual property asset display profiles; and preferentially displaying an intellectual property asset display profile in a geographic region corresponding to the selected output device from amongst the plurality of intellectual property asset display profiles.

8. A workspace environment, comprising:

a plurality of workspace location, each of the plurality of workspace locations comprising a visual output device; and a controller, comprising:

an asset information module structured to access an intellectual property asset display profile information set comprising a plurality of intellectual property asset display profiles, each intellectual property asset display profile of the plurality intellectual property asset display profiles comprising a creative intellectual property asset description corresponding to an associated intellectual property asset creator and a related person to the associated intellectual property asset creator, the related person being in a same business unit of a company as the associated intellectual property asset creator, being in a same group of the company as the associated intellectual property asset creator, or being at least one of a customer, a vendor, or a supplier associated with the associated intellectual property asset creator;

a related person module structured to detect a badge scan associated with a person, and determine a location and an identity of the person based on the detected badge scan associated with the person, the identity of the person being the related person or the associated intellectual property asset creator;

an asset reward module structured to determine an intellectual property asset display context based on the determined location and identity of the person from the detected badge scan; and an asset display module structured to dynamically provide an intellectual property asset display description to a selected output device and cycle through the plurality of intellectual property asset display profiles to change a display of the selected output device, wherein the selected output device includes a visual output device associated with an unassigned workspace.

9. The workspace environment of claim 8, wherein the related person further comprises at least one person selected from the group of persons consisting of: an associated intellectual property asset creator, a supervisor of the associated intellectual property asset creator, a person supervised by the associated intellectual property asset creator, a person appearing in an e-mail list of the associated intellectual property asset creator, a person predetermined by a marketing person working in the same business as the associated intellectual property asset creator, and a person predetermined by any one or more of the persons preceding or appearing in an e-mail list of any one or more of the persons preceding.

10. An apparatus, comprising:
an asset information circuit structured to access an intellectual property asset display profile information set comprising a plurality of intellectual property asset display profiles, each intellectual property asset display profile of the plurality of intellectual property asset display profiles comprising a creative intellectual property asset description corresponding to an associated intellectual property asset creator and a related person to the associated intellectual property asset creator, the related person being in a same business unit of a company as the associated intellectual property asset creator, being in a same group of the company as the associated intellectual property asset creator, or being at least one of a customer, a vendor, or a supplier associated with the associated intellectual property asset creator;
a related person circuit structured to detect a badge scan associated with a person, and determine a location and an identity of the person based on the detected badge scan associated with the person, the identity of the person being the related person or the associated intellectual property asset creator;
an asset reward circuit structured to determine an intellectual property asset display context responsive to the plurality of intellectual property asset display profiles based on the determined identity and location of the person from the detected badge scan; and
an asset display circuit structured to identify a plurality of workspace locations, each of the plurality of workspace locations comprising a visual output device, and to provide an intellectual property asset display description to a selected output device and cycle through the plurality intellectual property asset display profiles to change a display of the selected output device, wherein the selected output device includes a visual output device associated with an unassigned workspace.

11. The apparatus of claim 10, wherein the related person further comprises at least one person selected from the group of persons consisting of: an associated intellectual property asset creator, a supervisor of the associated intellectual property asset creator, a person supervised by the associated intellectual property asset creator, a person appearing in an e-mail list of the associated intellectual property asset creator, a person predetermined by a marketing person working in the same business as the associated intellectual property asset creator, and a person predetermined by any one or more of the persons preceding or appearing in an e-mail list of any one or more of the persons preceding.

12. The apparatus of claim 10, wherein the intellectual property asset display circuit is structured to provide a symbolization value of the creative intellectual property asset display description, the symbolization value configured to provide a representation of the creative intellectual property asset display description.

13. The apparatus of claim 12, wherein the symbolization value includes at least one of an e-mail signature, an intranet directory entry, an internet directory entry, a messaging signature, a physical and/or virtual business card, a computing device screen saver display, a computing device resting state display, and an electronic picture device display.

14. The apparatus of claim 10, wherein the asset reward circuit is structured to determine and arrange the plurality of intellectual property asset display profiles based on one or more relationship characteristics, the one or more relationship characteristics including at least one of asset display profiles related to a particular product, a creator, a timeframe of interest, and a geographical location.

* * * * *